No. 738,308. PATENTED SEPT. 8, 1903.
C. T. FINLAYSON.
DUMPING DEVICE FOR AERIAL TRAMWAYS.
APPLICATION FILED JAN. 19, 1903.
NO MODEL. 6 SHEETS—SHEET 2.
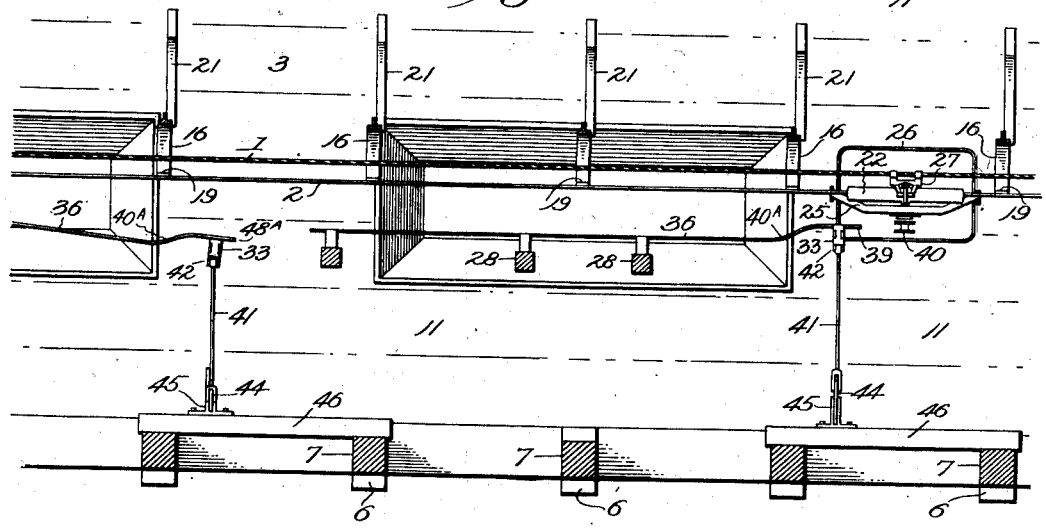
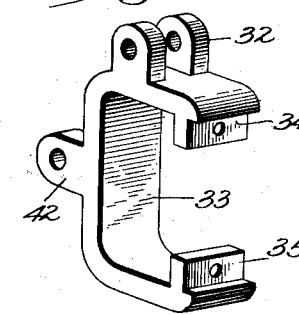
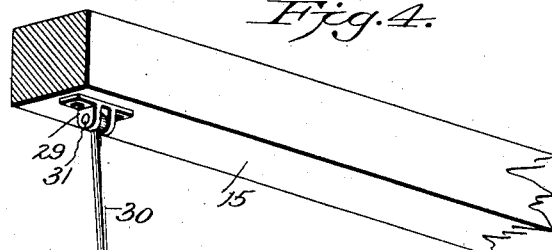
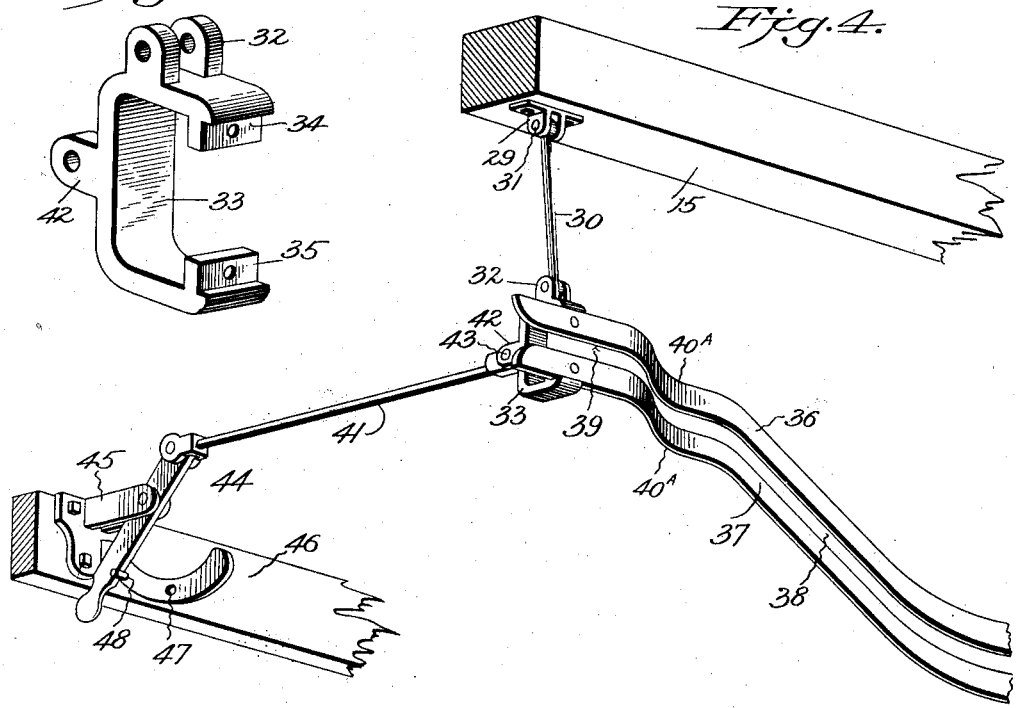
Witnesses:
G. Sargent Elliott.
Bessie Thompson
Inventor:
By Christopher T. Finlayson
H. S. Bailey, Attorney.

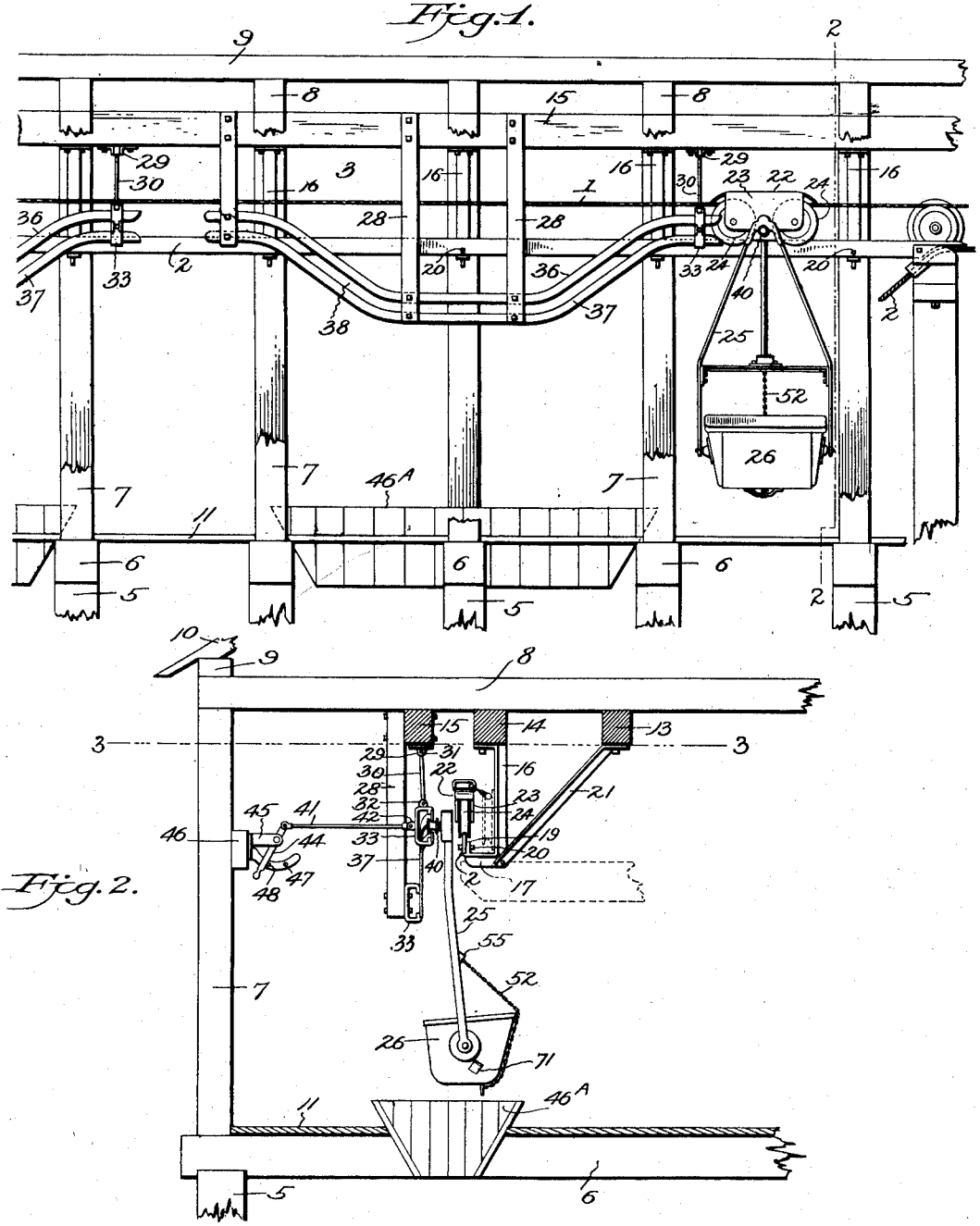

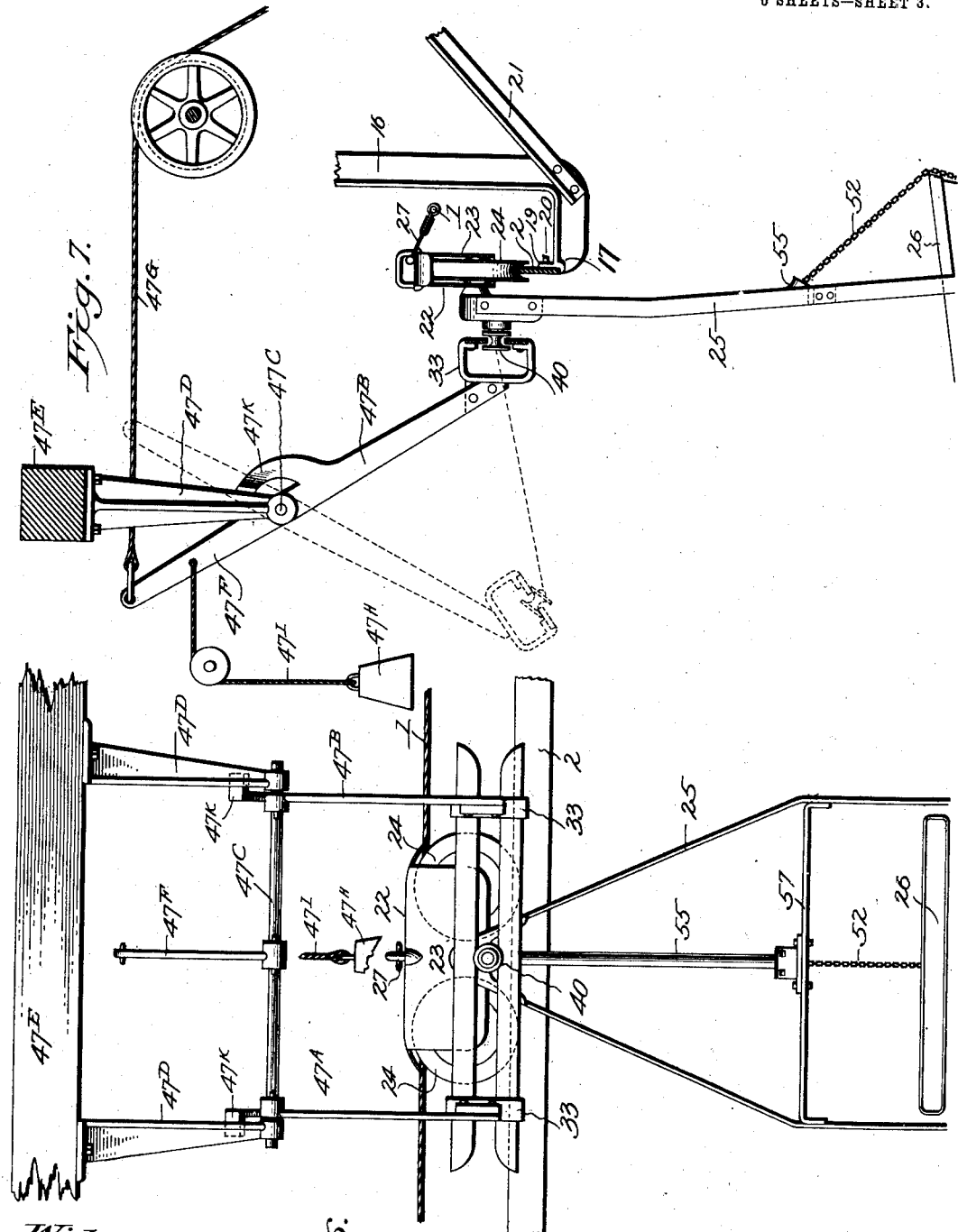

No. 738,308. PATENTED SEPT. 8, 1903.
C. T. FINLAYSON.
DUMPING DEVICE FOR AERIAL TRAMWAYS.
APPLICATION FILED JAN. 19, 1903.
NO MODEL. 6 SHEETS—SHEET 4.
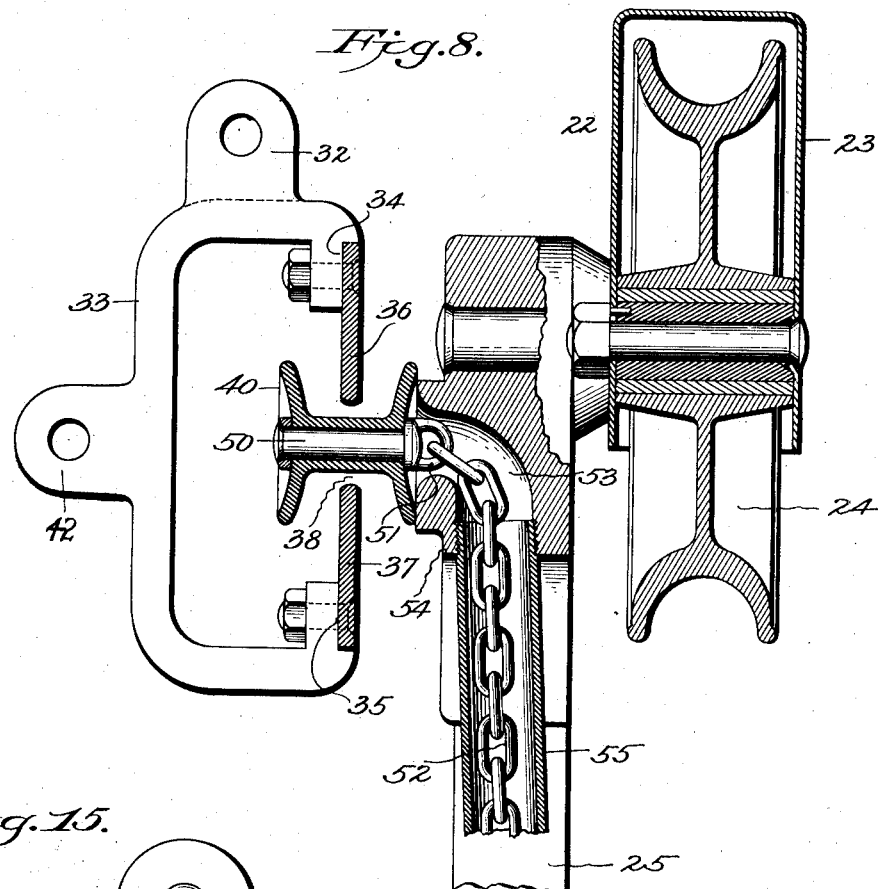
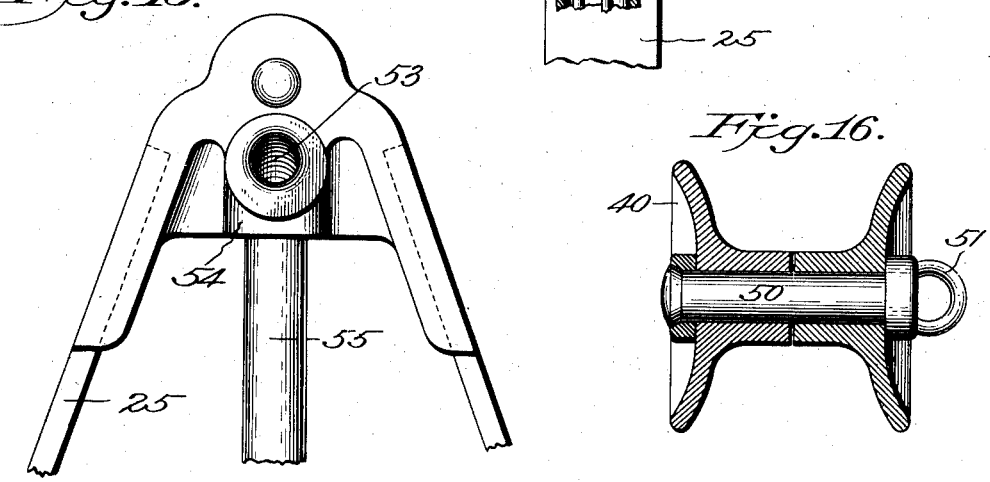

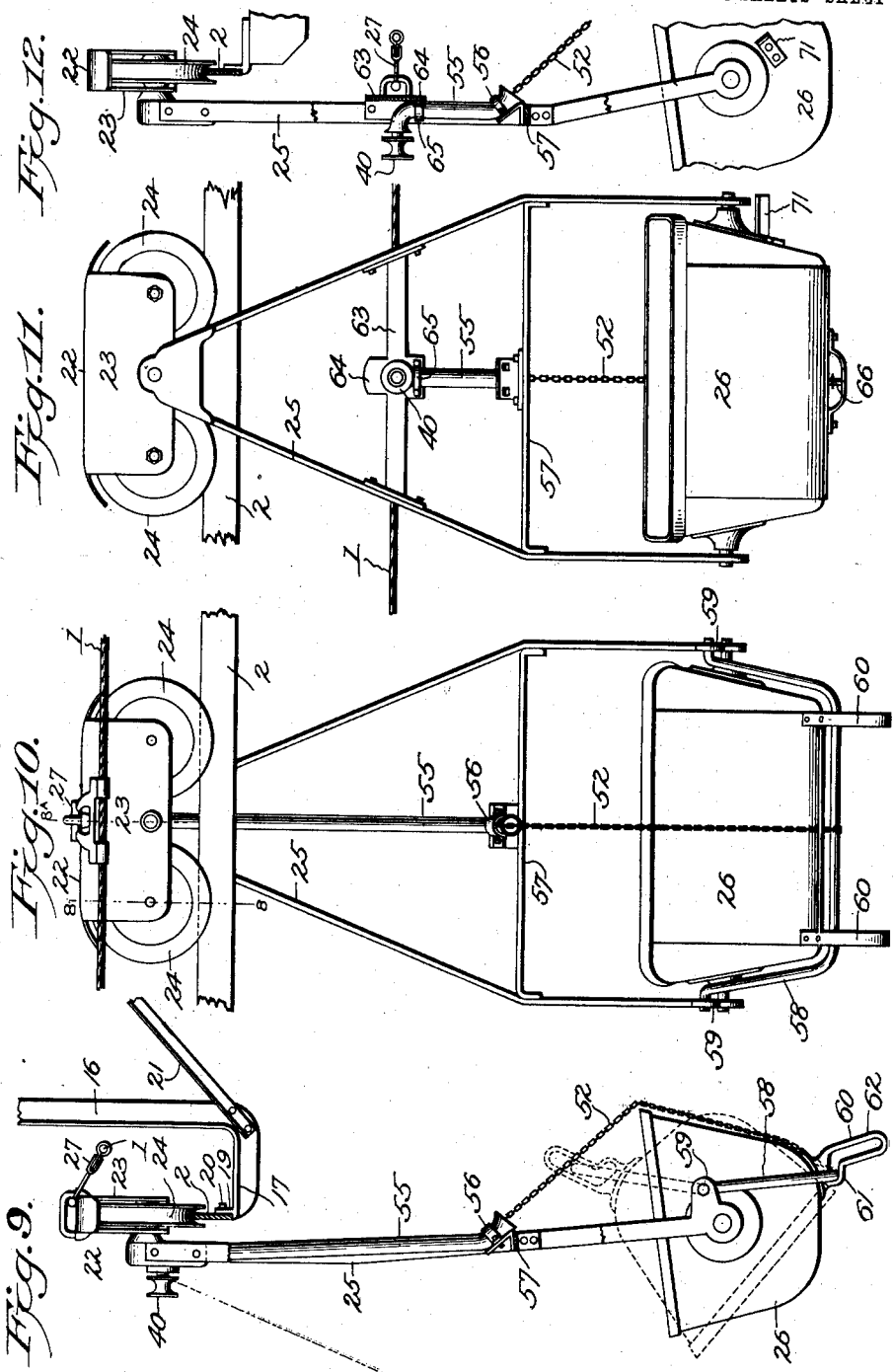

No. 738,308. PATENTED SEPT. 8, 1903.
C. T. FINLAYSON.
DUMPING DEVICE FOR AERIAL TRAMWAYS.
APPLICATION FILED JAN. 19, 1903.
NO MODEL. 6 SHEETS—SHEET 6.
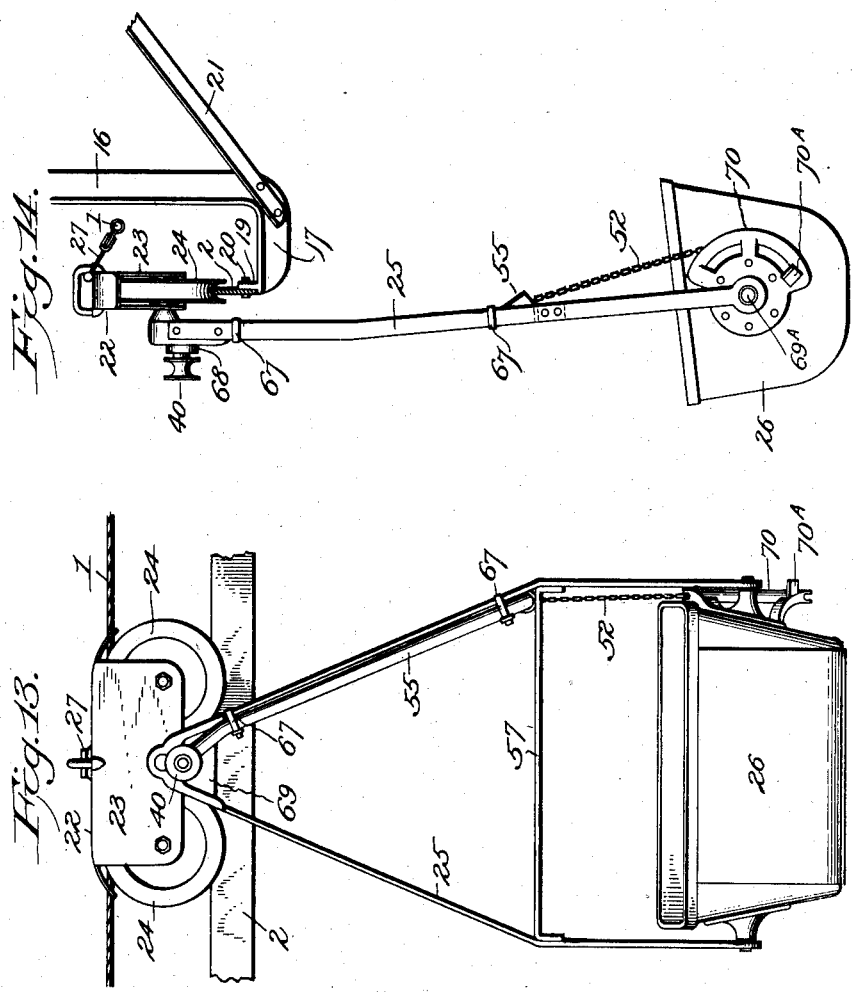

No. 738,308. Patented September 8, 1903.

UNITED STATES PATENT OFFICE.

CHRISTOPHER T. FINLAYSON, OF DENVER, COLORADO.

DUMPING DEVICE FOR AERIAL TRAMWAYS.

SPECIFICATION forming part of Letters Patent No. 738,308, dated September 8, 1903.

Application filed January 19, 1903. Serial No. 139,612. (No model.)

*To all whom it may concern:*

Be it known that I, CHRISTOPHER T. FINLAYSON, a citizen of the United States of America, residing at Denver, in the county of Denver and State of Colorado, have invented certain new and useful Improvements in Dumping Devices for Aerial Wire-Rope Tramways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in dumping devices for aerial wire-rope tramways.

Aerial wire-rope tramways consist of either one or two ropes stretched between two points called "terminals" above the ground upon suitable towers and may vary in length from a few hundred feet to several miles. They are especially adapted to convey ore, coal, provisions, and other material down and up mountainous countries, over gulches and rivers. Where only one rope is used, the tramway is called a "single-rope" system. Where two ropes are used, the system is called the "double-rope" system. There are two types of the double-rope system—one called the "overhead" system, in which the traction-rope is positioned above the track-rope, and the other called the "depending" system, in which the traction-rope is placed below the track-rope. In the single-rope system the traction-rope is used to convey and support the bucket or carrier. In the double-rope system the traction-rope is used to convey or propel the trolley and buckets or carrier, and the track-rope supports a trolley which supports the bucket or carrier, the trolley running on the track-rope. The terminals are timber structures which support a large sheave or rope-gripping sheave-wheel, around which the traction-rope runs. The traction-rope is an endless running rope. The track-ropes are stationary ropes that at the terminals generally merge into metal rails or tracks curved around the ends of the terminals, so that a continuous track is formed around the terminals and from end to end of the tram-line. The buckets or carriers are loaded at one end and unloaded at the opposite end, and loading or unloading stations can be inserted wherever necessary in the various systems in use.

The objects of my invention are, first, to provide a dumping device that can be used on either the double-rope or single-rope system of wire-rope tramways; second, to provide a dumping device that is especially adapted to the two types of double-rope tramways known as the "overhead" system, in which the traction-rope is placed above the track-rope, and also to the depending system, in which the traction-rope is placed below the track-rope, and also to the system in which one rope is used both as a traction-rope and as a bucket or carrier supporting rope; third, to provide means for automatically dumping a bucket at any desired points of a tramway-line or at any desired point at either side of a tramway terminal; fourth, to provide means for automatically dumping a moving bucket or carrier at any desired point at either side of a terminal or at any desired point in the length of the tram-line; fifth, to provide means for dumping a standing or stationary bucket or carrier at any point at either side of a terminal or at any point in the length of a tram-line; sixth, to provide means for automatically or manually causing a bucket or carrier to pass at will the dumping-stations or the terminals; seventh, to provide a simple and positive mechanism for dumping a bucket or carrier on any of the wire-rope tramway systems in common use. I attain these objects by the mechanism described in the accompanying drawings, in which—

Figure 1 is a side elevation of a fragment of a terminal of a wire-rope tramway, showing the application of my automatic dumping device to it. Fig. 2 is a cross-section of Fig. 1 on line 2 2. Fig. 3 is a sectional plan view of Fig. 1. Fig. 4 is a perspective view of the manually-operating mechanism for moving the bucket or carrier dumping mechanism out of the path of a running bucket or carrier, so that it may pass the dumping-station. Fig. 5 is a perspective view of the track-yoke. Fig. 6 is a side elevation of mechanism I employ for dumping a standing bucket. Fig. 7 is an end elevation of Fig. 6. Fig. 8 is an enlarged fragmentary sectional view of Fig. 10 on lines 8 8 and 8ᴬ 8ᴬ. Fig. 9 is an end elevation of Fig. 10. Fig. 10 is a front elevation of an enlarged fragment of my dumping mechanism as applied to the overhead system of double-rope tramways. Fig. 11 is a side elevation of an enlarged fragment of my dumping mechanism as applied to the depending system of double-rope tramways. Fig. 12 is an end elevation of Fig. 11. Fig. 13 is a side elevation of a modification of attaching the bucket to the dumping-actuating mechanism. Fig. 14 is an end elevation of Fig. 13. Fig. 15 is an enlarged side elevation of a fragment of the top end of the bucket-pendant; and Fig. 16 is a sectional view of the guide-rail's roller, arranged so that one half can rotate in one direction and the opposite half can rotate in the opposite direction.

Similar figures of reference refer to similar parts throughout the several views.

Referring to the drawings, the numeral 1 designates the traction-rope, and 2 the track rope or rail of a double-rope tramway, and hereinafter the traction-rope will be designated by the numeral 1, whether it relates to the single-rope or double-rope system.

The numeral 3 designates a terminal, a fragment of the track-rope 2 being shown connecting to the track-rail 2. The traction-rope 1 is positioned above the track-rope. Consequently the dumping device illustrated in Figs. 1, 2, 3, 4, 6, 7, 8, 9, and 10 is adapted for use on the overhead system of double-rope tramways. The terminal 3 is a timber structure arranged and adapted to support the traction-rope and the track and bucket and the storage-bins of the dumping-station. The dumping-station is always placed at the discharging end of the tramway; but on tramways for mines in mountainous countries it is usual to place bucket dumping mechanism at both the upper and lower terminals, as it is customary to convey coal and supplies up to the mine, as well as to transmit the ore down from the mine. Consequently my dumping device may be applied to or be a part of both terminals of a tramway. Sometimes branch tramway-lines are constructed that connect to the main line of a tramway, in which case it is necessary to have bins and dumping mechanism at the connecting-point of the main and branch lines, and it may be desired to discharge loaded buckets at some particular point in a tram-line between the terminals. My dumping device is particularly adapted for the last two uses.

The terminals of tramways are usually housed in a suitable building; but one of the features of my dumping device and terminal is that the track-ropes and dumping guide-rails and mechanism are preferably suspended from above, and this enables me to so construct the framework that the side timbers 5 (see Figs. 1 and 2) may form the foundation, the timbers 6 the floor-joists, the timbers 7 the side studs or posts, the timbers 8 the tie-beams, the timber 9 the plate, 10 the rafters, only a fragment of which is shown, and 11 the flooring of a building that at the same time constitutes the terminals of a tramway and the supporting structure of my dumping device.

Another very important feature of my dumping device, as illustrated, is that when the supporting-framework is constructed as shown the entire space between the sides or wall-posts of the structure is entirely clear of posts and timbers, enabling a clear view of the incoming and outgoing buckets or carriers, as well as an unobstructed floor-space for attendants to work in.

To the under side of the tie-beams 8 I secure three timbers 13, 14, and 15, arranging them parallel to one another. To the under sides of the timbers 13 and 14 I secure a number of depending vertical angle-iron brackets 16, the lower end of which is turned at right angles to the vertical arm for a short distance and forms a horizontal rest 17 for the metal track 2, which is a continuation of the track-rope around the terminal. The end of the horizontal arm 17 of the angle-iron bracket is provided with a short vertical rib 19, which is positioned just far enough from the end of the bracket to allow the track 2 to rest on it and against the rib and be even with the end of the bracket, thus forming a step. The track-rail rests on this step and is bolted by bolts 20 to the rib. These brackets are positioned at suitable distances apart along the dumping structure, and each bracket is supported by a strut 21, which is secured at one end to the timber 13 and at its opposite end to the lower end of the bracket.

Upon the track 2 the trolley 22 of the bucket or carrier is mounted, a bucket being preferably shown in the drawings. This trolley comprises the housing 23 and the sheave-wheels 24. The sheave-wheels rest and run on the track or track-rope. A pendant 25 is pivotally attached to one side of the trolley, and a bucket 26 is pivotally secured between the lower ends of the pendant, so that it can be tilted or dumped between the ends of the pendants. In the overhead system, such as is illustrated in most of the figures of the drawings, the rope-clip 27, that propels the trolley, is secured to the trolley at one end and to the traction-rope 1 at the opposite end, while in the depending system the clip 27 is attached to the bucket-pendant or to some gripping mechanism attached to the pendant of the bucket at one end and to the traction-rope at its opposite end, as shown in Figs. 11 and 12.

To the side of the timber 15, opposite from the track 2, I secure a number of vertically-depending standards 28. To the under side of the timber 15 I secure at predetermined points a lug-plate 29, to which I pivotally secure one end of a depending rod 30 by a pin or bolt 31. The lower end of this rod is pivotally secured to lug-plates 32, which form an integral part of a double-track-supporting yoke 33. This yoke stands in a vertical position and is provided with two oppositely-disposed introverted lips 34 and 35, which are placed far enough back from the ends of the yoke to form a step for the guide-rails 36 and 37 to rest on. These guide-rails are secured to the lips of the yoke and also to the depending standards by bolts or rivets. The guide-rails are preferably positioned in a vertical plane, one over the other and at a short space apart, which forms a slot 38 between them into the space formed between the guide-rails and the back of the yoke. These guide-rails are positioned wherever it is desired to automatically dump a moving bucket. Their front and terminal ends are arranged in a horizontal plane just below the pivotal pin, that connects the pendant to the trolley and on the side of the pendant farthest from the trolley. Their front ends 39 are placed close enough to the rail and to the path of the pendant to receive between them a spool 40, which is normally held against the side of the pendant by the bucket, as will be fully explained hereinafter. The guide-rails at a short distance from their front ends are provided with a short offset curve $40^A$; but from this curve they extend along parallel with the track 2, but far enough from it so that they are out of the path of the spool the remainder of their lengths. Consequently the spool, should it pass the entrance end of the guide-rails, is entirely clear of them and cannot become connected to them as it passes by them. The guide-rails are arranged in this manner in order to allow their spool-entrance end to be sprung aside whenever it is desired to allow a loaded or empty bucket to pass without dumping it. This is done by means of a rod 41, which is pivotally connected at one end to ears 42, that are formed on the back of the yoke by a pin 43. The opposite end of the rod 41 is pivotally secured to one end of a lever 44, on the opposite end of which a handle is formed. The lever is pivotally connected intermediate of its ends to the slotted end of a bracket 45, which is secured to a support 46, that is secured to the side posts of the framework. From the bracket an arm projects close to the handle of the lever and into the plane the lever moves in, and pin-holes 47 are formed in the lever at predetermined points, and a locking-pin 48 is fitted to them. The lever and rod are arranged so that when they are moved in one direction of their operative movement they will move the entrance to the guide-rails into the path of the spool of the pendant, so that it will enter the slot between them, and when moved to the opposite direction of their operative movement they will spring the entrance ends of the guide-rails back out of the path of the spool, as shown at $48^A$ in Fig. 3, in which case the spool will pass the guide-rails and the bucket will not be dumped. From the curved portion $40^A$, of the guide-rails I construct the remainder of the length of the rails for automatically dumping a bucket as follows: The guide-rails intermediate of their ends are deflected, preferably, first downward a predetermined distance, which is sufficient to move the spool which is attached to the bucket by a chain, and when moved by the guide-rails dumps the bucket, as will be explained fully hereinafter. They are then bent to extend straight or horizontally with the track 2 for a distance sufficient to hold the bucket in a dumped position until it fully discharges its contents while moving. The rails are then curved upward to the same height as at the entrance end and then curved to terminate in a straight portion. The upward inclination of the rails allows the spool to travel back to its normal position against the pendant of the bucket. These bucket-dumping guide-rails are positioned over storage-bins $46^A$, which are built in the floor of the supporting structure underneath the point where the buckets are to be dumped, and as many bins and dumping guide-rails may be placed along the terminals or along a tram-line at points where it is desired to dump ore as required, or they can be arranged in continuous order close together. When dumping a standing or stationary bucket, however, the tracks are made straight and parallel with the track 2 from one end to the other, the curve used in the rails for dumping a moving bucket being dispensed with, and the rails lie throughout their length in the path of the spool. In order, however, to dump a stationary or standing bucket, I employ a slightly-different mechanism from that employed to move the entrance end of the rails out of the path of the spool. The guide-rails for dumping a standing bucket are made shorter than the guide-rails for dumping a moving bucket and may also be placed in successive order over separate bins or, if desired, over a continuous long bin at any point in the length of the tram. When dumping a stationary bucket, it is necessary to first release the clip or grip from the bucket or traction rope $l$, as this rope runs continuously. I do not illustrate means for accomplishing this, as it does not form any part of my present invention. In dumping a stationary bucket the spool and chain are pulled out from the bucket-pendant to dump the bucket, as in the case of the moving bucket, and in order to pull the spool and chain after the spool has entered the slot between the rails I secure the straight guide-rails, which are short and light of weight, to two yokes 33, each of which is attached to one end of two levers $47^A$ and $47^B$, the yokes being secured to the rails near their opposite ends. These levers are secured at their opposite ends to a shaft $47^C$, which is supported in the ends of depending hangers $47^D$, that are secured to an overhead timber $47^E$, attached to the supporting structure. The depending brackets are positioned to enable the levers to be moved far enough to pull the spool and chain far enough to dump the bucket, as indicated by the dotted lines in Fig. 7. An upwardlyprojecting arm 47$^F$ is secured to the shaft 47$^C$, to the free end of which a rope 47$^G$ is attached, which is preferably carried over an idler-sheave placed over the dumping mechanism to a position where it can be operated either by an attendant or by some suitable means. Consequently whenever it is desired to dump a bucket that is dumpingly connected to the guide-rails it is only necessary to pull the rope, which will move the levers to move the rails and spool and chain to dump the bucket, as will be explained hereinafter. A weight 47$^H$ is attached by a rope 47$^I$ to the arm 47$^F$ and holds the dumping device in its normal position, where it is limited by stops 47$^K$ on the levers 47$^A$ and 47$^B$, which contact with the hangers 47$^D$.

The spool is rotatably mounted on a pin 50, which is secured thereto, upon one end of which is formed a loop 51. In Fig. 16 I show the spool made in two halves transversely through its length, so that each end may rotate independent of the other, this arrangement being adapted to the swinging track shown in Figs. 6 and 7, in which arrangement, when the guide-rails are swung out, as shown in dotted lines in Fig. 7, one half of the spool will rotate on the lower rail and the other half on the upper rail. The loop 51 is connected to one end of a chain 52, which passes through a downwardly-curved aperture 53, formed in the top of the pendant just below the pivotal pin that connects the pendant to the trolley. This curved aperture enters the front side of the casting at the top of the pendant through the center of a hub 54 and curves downward and comes out at the bottom of the casting between the side bars of the pendant. (See Fig. 8.) To the bottom of the aperture I secure one end of a casing 55, which I preferably employ to form a covering and conduit for the chain, the opposite end of which is connected by a clip 56 to an angled cross-bar 57, which extends across the pendant of the buckets and is secured thereto. The lower terminal end of the casing is curved, preferably, toward the track and trolley side of the tram-line and is flared outward. The chain passes through the casing and extends over and around the bucket and is connected to a bucket-locking bar 58, that extends from the lower ends of the bucket-pendant and extends down the sides and under the bottom of the bucket. The lower end of the pendants above the points of their pivotal connection with said bucket is provided with a short rearward extension 59, to the end of which the ends of the locking-bar are pivotally secured. To each of the opposite ends of the bottom of the bucket I secure, downwardly and slightly rearwardly, brackets 60, each of which is provided with an angular slot consisting of a subtantially horizontal portion 61 and a substantially vertically inclined portion 62, through which the locking-bar passes. When the bucket is in its normal upright position, the locking-bar rests in the end of the horizontal portion 61 of the slot and locks the bucket against accidental movement; but when the bucket is turned over, as shown in dotted lines in Fig. 9, the locking-lever moves to the opposite end of the horizontal slot 61 and along the vertical slot 62.

In Figs. 11 and 12 I illustrate this bucket-dumping mechanism adapted to the depending traction-rope system of double-rope tramways. In this system the traction-rope and the clip are positioned below the track 2, and the clip is secured either manually or automatically to a cross-bar 63 of the pendant. I illustrate the clip secured to a plate 64, that forms a part of the cross-bar 63. A clip 65 is secured to this plate and cross-bar and supports the upper end portion of the chain-casing, which in this system extends only from opposite the traction-rope and clip to the angled cross-bar 57, which is located in the same position as in Figs. 9 and 10. The top end of the chain-casing is curved at right angles to the vertical portion and to the front side of the pendant and bracket and is flared outward. The lower terminal end is like the terminal shown in Figs. 9 and 10. The bucket may be provided with the same locking and chain attachment device as Figs. 9 and 10, or, if desired, in place of this a simple loop-clip 66 may be secured to the bottom of the bucket, as shown in Figs. 11 and 12, and the chain may be attached to it.

In Figs. 13 and 14 I show a modification of the arrangement of the bucket-dumping mechanism. This modification, as illustrated, is adapted to the overhead system, but can be applied to the depending system. (Shown in Figs. 11 and 12 as well.) This modification consists of extending the chain-casing down one of the sides of the pendant and of securing it to the side of the pendant by clips 67. The upper end of the chain-casing extends to a hub 68, formed on the casting at the apex of the pendant, the casting in this case being open below the hub and having only a web 69 at the back, thus allowing the casing to extend up to the hub, which is provided with an aperture similar to that shown in Fig. 8. The lower terminal end of the casing is curved and flared outward—the same as in the other views. The chain extends down the side of the pendant to the end of the bucket, where it is connected to a segment of a sheave 70, in the tread of which it is seated and secured. This segment of a sheave is riveted to the end of the bucket concentric to the pin 69$^A$ of the bucket, to which the end of the pendant is pivotally secured. From the lower edge of the segment an arm 70$^A$ projects, which forms a stop, and when the bucket is turned to dump it the stop engages the adjacent end of the pendant, thus preventing the bucket from being turned completely over. A stop 71 is also shown attached to the bucket in Figs. 2, 11, and 12. I preferably use a bucket that is overbalanced on one side and preferably place the overbalance side on the same side of the pendant as the track 2 and traction-rope 1 and arrange the dumping to the rearward or overbalanced side, so that the overbalanced weight of the bucket and of its load is on the chain and holds the spool against the front side of the pendant. The stops and the arrangements shown in Figs. 9 and 10 prevent the bucket from passing over the center.

The operation of my improved dumping device is as follows for continuously-moving buckets: As the bucket is attached to the traction-rope and is moved by it over the track-rope and track 2 without stopping the spool when the bucket arrives at the guide-rails enters the slot between them and as the bucket continues right along the spool runs down the inclined slot between the rails, which is of sufficient length to pull the spool and chain far enough to tip the bucket into full dumping position by the time the spool has reached the lower straight portion of the track, along which it is pulled by the moving bucket, which holds the bucket in its turned-up dumping position while it is traveling over the lower straight portion of the rails, thus giving it ample time in which to discharge itself. The spool then runs up the inclined slot and out of the rails, thus allowing the bucket to right itself practically as gradually as it is tilted at the opposite end of the guide-rails. The bucket is thus tilted, dumped, and righted into its normal position without sudden shock or jar or noise and without stopping it in its course around the tramway-line, while for stationary buckets that have been detached from the traction-rope it is only necessary to operate the rope to move the short straight guide-rails back, as above described and as shown in Figs. 6 and 7.

My invention is simple, durable, and easily applied to tramway-lines at small expense.

Having described my invention, what I claim as new, and desire to secure by Letters Patent, is—

1. In a bucket-dumping device for wire-rope tramways, an operative tramway, a tiltable pendant bucket or carrier, a flexible member connected at one end to said bucket or carrier and provided at its opposite end with an enlarged head member arranged to normally rest against the side of said pendant and to project laterally from it, and means including guide-rails for engaging and actuating said head member and said flexible member to dump said bucket, substantially as described.

2. In a bucket-dumping device for wire-rope tramways, the combination with a tramway pendant-bucket, of a chain secured at one end to the bucket and provided with an enlarged head member at its opposite end arranged to rest normally against and to project from said pendant, a guideway for said chain and means including a guideway for engaging said head member of said chain at predetermined points in the length of a tram-line, and for pulling said head and chain to dump said bucket, substantially as described.

3. In a bucket-dumping device for wire-rope tramways, the combination with an operative pendant-supported tramway bucket or carrier, of a flexible member secured to said bucket or carrier, a guideway for said flexible member leading to the side of said pendant, an enlarged head member or spool secured to the free end of said flexible member and arranged to rest normally against the pendant-entrance to said guideway and to project therefrom, and means including guide-rails for engaging said head or spool member and arranged and adapted to move said head or spool and said chain to dump said bucket or carrier, substantially as described.

4. In a dumping device for wire-rope tramways, the combination with the track-rope of an operative pendant-supporting bucket or carrier, of a chain secured at one end to said bucket or carrier, a guideway for said chain at one side of said pendant, a spool secured to the free end of said chain and normally held by said chain against the entrance of said guideway, guide-rails arranged in the path of said spool and arranged to engage and to hold to the same throughout their length, and provided with a deflecting portion in their length adapted to pull said spool and chain to dump said bucket or carrier, substantially as described.

5. In a dumping device for wire-rope tramways, the combination with an operative trolley and pendant-supporting bucket or carrier, of a chain secured at one end to said bucket or carrier, a guideway in said pendant for the free end of said chain, a head or spool secured to the free end of said chain and projecting from said pendant, guide-rails arranged in the path of said spool, a deflection in said guide-rails and means including a manually-operating lever for moving said guide-rails out of the path of said head or spool, substantially as described.

6. In a dumping device for wire-rope tramways, the combination with an operative trolley and pendant bucket or carrier, of a chain secured at one end to said bucket, a guideway for the free end of said chain on said pendant, a head or spool attached to the free end of said chain and normally held against the entrance to said pendant by said chain and projecting therefrom, guide-rails arranged in the path of said head or spool and arranged to engage and to hold to said head or spool while said bucket or carrier is passing by them, and means including a lever for moving the receiving ends of said guide-rails laterally to pull said spool and chain to dump said bucket or carrier, substantially as described.

7. In a dumping device for wire-rope tramways, the combination with the pendant and bucket and the rope, of the chain, the guideway in the pendant for said chain, the spool at the free end of said chain and the guide-rails arranged to pull said spool and chain to dump said bucket, substantially as described.

8. In a dumping device for wire-rope tramways the combination with the trolley, the pendant, the bucket, the track and the traction-ropes, of a chain secured at one end to said bucket, a guideway in said pendant for the free end of said chain on said pendant, a spool secured to the free end of said chain and normally held against said pendant by said chain and projecting laterally from said pendant, a guiding and holding device arranged at its spool-engaging end in the moving path of said spool and its remaining portion out of the path of said spool and consisting of guides having a slot between them and adapted to straddle said spool, a reverse vertically-disposed curve in said guides and slot having a straight portion between them, a suitable support for said guides and means including a manually-operating lever for moving the entrance end of said guides and slot out of the path of said spool, substantially as described.

9. In a dumping device for wire-rope tramways, the combination of the trolley, the pendant, the bucket and the traction-rope and track, with the chain secured at one end to said bucket, the guideway for said chain on the farther side of said pendant, the spool pivotally mounted at the end of said chain and arranged to bear against the front side of said pendant, the guide-rails having their spool-entering ends arranged to stand in the path of said spool and arranged with a lateral offset adjacent to their spool-entering ends, and having said rails throughout the remainder of their length arranged substantially parallel with but farther away from the passing path of said bucket-pendant than the spool-entering end of said rails and of said spool when said spool is resting normally against said pendant a central deflecting portion in said spool-receiving guide-rails adapted to move said spool far enough away from said pendant to dump said bucket and to return it to its normal position on said pendant at the terminal ends of said spool guide-rails, and a suitable bin below said bucket and guide-rails, substantially as described.

10. In a dumping device for wire-rope tramways, the combination with a tram-line, and a pendant-supported bucket or carrier, of a flexible member secured at one end to said bucket or carrier and slidably supported on said pendant, a head or spool member on the free end of said flexible member normally projecting from said pendant and a slotted track operatively supported intermediate of the ends of said tram-line in the path of said spool arranged and adapted to engage said head or spool and to lead it in a direction to pull said flexible member to dump said bucket and to return said flexible member and spool to their normal position on said pendant, substantially as described.

11. In a dumping device for wire-rope tramways, the combination with a tram-line, and a pendant-supported bucket or carrier, of a flexible member secured at one end to said bucket or carrier and slidably supported on said pendant, a head or spool member on the free end of said flexible member normally projecting from said pendant and a slotted track operatively supported intermediate of the ends of said tram-line in the path of said spool arranged and adapted to engage said head or spool and to lead it in a direction to pull said flexible member to dump said bucket and to return said flexible member and spool to their normal position on said pendant, and means for moving said rails out of the path of said head or spool substantially as described.

12. In a dumping device for wire-rope tramways, the combination of the ropes, the trolley-bucket and the chain and spool, with the slotted spool guide-rails having their spool-receiving and terminal slotted ends arranged to receive and discharge said spool from and in its normal operative position, a lateral offset in said guide-rails adjacent to their spool-receiving ends, an inclined portion continuous from said offset portion adapted to pull said chain, a substantially horizontal portion continuous from said inclined portion adapted to hold said bucket in a dumped position, an inclined portion continuous to said straight portion adapted to return said spool to its normal position, a pivotal support for the spool-receiving end of said slotted guide-rails, a rod pivotally secured to said guide-rails' support, and means including a lever for adjustably moving said slotted guide-rails into and out of the path of said spool, substantially as described.

13. In a dumping device for wire-rope tramways, the combination of the trolley-track and traction-rope, and the trolley-bucket and dumping chain and spool, of a suitable supporting structure, a deflecting portion in the spool-engaging guide-rails, said guide-rails adapted to guide said spool and pull said chain to dump said bucket and to return said chain and spool to their normal position relative to said bucket and pendant, means including a lever for moving the spool-receiving ends of said guide-rails out of the path of any predetermined passing bucket, and a suitable storage-bin arranged to receive the discharge of said bucket, substantially as described.

14. In a dumping device for wire-rope tramways, the combination of the track and traction-rope and the trolley-bucket with a supporting structure for said track and traction-ropes, a pair of spool engaging and guiding rails arranged with their terminal ends in substantial horizontal alinement with said trolley-track and arranged a short distance apart to form a slot between them adapted to receive and form a guideway for said spool, a yoke arranged to support the entrance ends of said guide-rails at an operative distance apart to receive said spool, a depending swinging pivotal support for said yoke and spool-entering ends of said guide-rails, depending fixed supports for the central portion and terminal ends of said rails, and means for moving the spool-entrance ends of said rails out of the path of said spool, substantially as described.

15. In a dumping device for wire-rope tramways, the combination of a suitable supporting structure, the track and traction-rope, the trolley-bucket, the dumping-chain and spool, with a bucket standing in dumping position in said supporting structure, a shaft pivotally supported by said structure adjacent to said standing bucket, arms depending from said shaft, a yoke secured to the lower ends of said arms, rails secured to said yokes and positioned opposite said standing bucket to form a slot between them arranged in the path of said spool and adapted to receive said spool in the slot between them, and means including a lever for moving said slotted guide-rails and said spool and for pulling said chain laterally from said standing bucket to dump said bucket and return it to its normal position, substantially as described.

16. In a dumping device for wire-rope tramways, the combination with the track, the trolley-rope, the overhead supporting structure, the dumping guide-rails and the trolley pendant and bucket, of a pendant having a cross-bar between its trolley and the bucket, means including a suitable clip or grip for securing said traction-rope to said cross-bar, a casing or guideway having reverse flaring, curved terminal ends extending centrally from said cross-bar toward said bucket and arranged with its upper curved end on the opposite side of said pendant and cross-bar from said traction-rope and having its opposite flared end turned toward the side of said bucket, means for securing the said casing to said pendant, a loop-clip secured centrally to the bottom of said bucket, a chain secured at one end to said loop and extending around the side of said bucket into and through said casing, an enlarged head or spool secured to the free end of said chain and adapted to be held by said chain and bucket against said casing and cross-bar, substantially as described.

17. In a dumping device for wire-rope tramways the combination with the bucket and pendant, the track and traction-rope, and the supporting structure, of a chain secured at one end to the bucket in such a manner as to turn it to dump it when pulled, and having its free end leading to and extending through a guideway or casing to the side of said pendant at a point substantially opposite the normal position of said traction-rope, a head or spool on the free end of said chain, and means including a guideway secured to said structure for engaging said head or spool and pulling said chain to dump said bucket, substantially as described.

18. In a dumping device for wire-rope tramways, the combination with the trolley, the pendant, the bucket and the bucket-dumping chain, of a pin secured to the free end of said chain, a spool pivotally mounted on said pin provided with flanged end portions, substantially as described.

19. In a dumping device for wire-rope tramways, the combination with the trolley, the pendant, the bucket and the chain arranged and adapted at one end to dump said bucket a guideway-aperture, a casing arranged on said pendant through which said chain extends, a pin secured to the free end of said chain and projecting from the side of said pendant, and a flanged spool pivotally mounted on said pin, substantially as described.

20. In a dumping device for wire-rope tramways, the combination with the trolley, the pendant, the bucket and the chain arranged and adapted at one end to dump said bucket, a guideway-aperture, a casing arranged on said pendant through which said chain extends, a pin secured to the free end of said chain and projecting from the side of said pendant, and a flanged spool pivotally mounted on said pin and divided transversely in two at the central portion of its length, whereby each half of said spool is free to rotate in opposite directions, substantially as described.

In testimony whereof I affix my signature in presence of two witnesses.

CHRISTOPHER T. FINLAYSON.

Witnesses:
G. SARGENT ELLIOTT,
BESSIE THOMPSON.